United States Patent [19]
Kurtin et al.

[11] Patent Number: 6,053,610
[45] Date of Patent: Apr. 25, 2000

[54] ACTUATION MECHANISM FOR VARIABLE FOCAL LENGTH SPECTACLES

[75] Inventors: Stephen Kurtin, Sherman Oaks; Daniel E. Fedele, Simi Valley; Saul Epstein, Sherman Oaks, all of Calif.

[73] Assignee: Lane Research, Sherman Oaks, Calif.

[21] Appl. No.: 09/354,204

[22] Filed: Jul. 15, 1999

[51] Int. Cl.$^7$ .............................. G02C 1/00; G02B 3/12

[52] U.S. Cl. .......................... 351/41; 351/158; 359/666; 359/832

[58] Field of Search ...................... 351/41, 158; 359/665, 359/666, 832, 694, 703–706

[56] References Cited

U.S. PATENT DOCUMENTS

| | | | |
|---|---|---|---|
| 2,576,581 | 11/1951 | Edwards | 359/666 |
| 5,138,494 | 8/1992 | Kurtin | 359/666 |
| 5,371,629 | 12/1994 | Kurtin | 359/666 |
| 5,526,067 | 6/1996 | Cronin et al. | 351/41 |
| 5,688,620 | 11/1997 | Kurtin | 351/158 |
| 5,956,183 | 9/1999 | Epstein et al. | 359/666 |

*Primary Examiner*—Huy Mai
*Attorney, Agent, or Firm*—Saul Epstein

[57] ABSTRACT

An actuating mechanism for spectacles which include two variable focal length lens units. Each lens unit is fitted with a coupling member which extends from the lens unit into the bridge of the spectacles. A linearly-movable finger-operated slider, having a finger pad extending above the bridge, causes a cam within the bridge to rotate as it is moved, the cam being coupled to the coupling members causing them to move and the focal length of the lens units thereby to change.

14 Claims, 4 Drawing Sheets

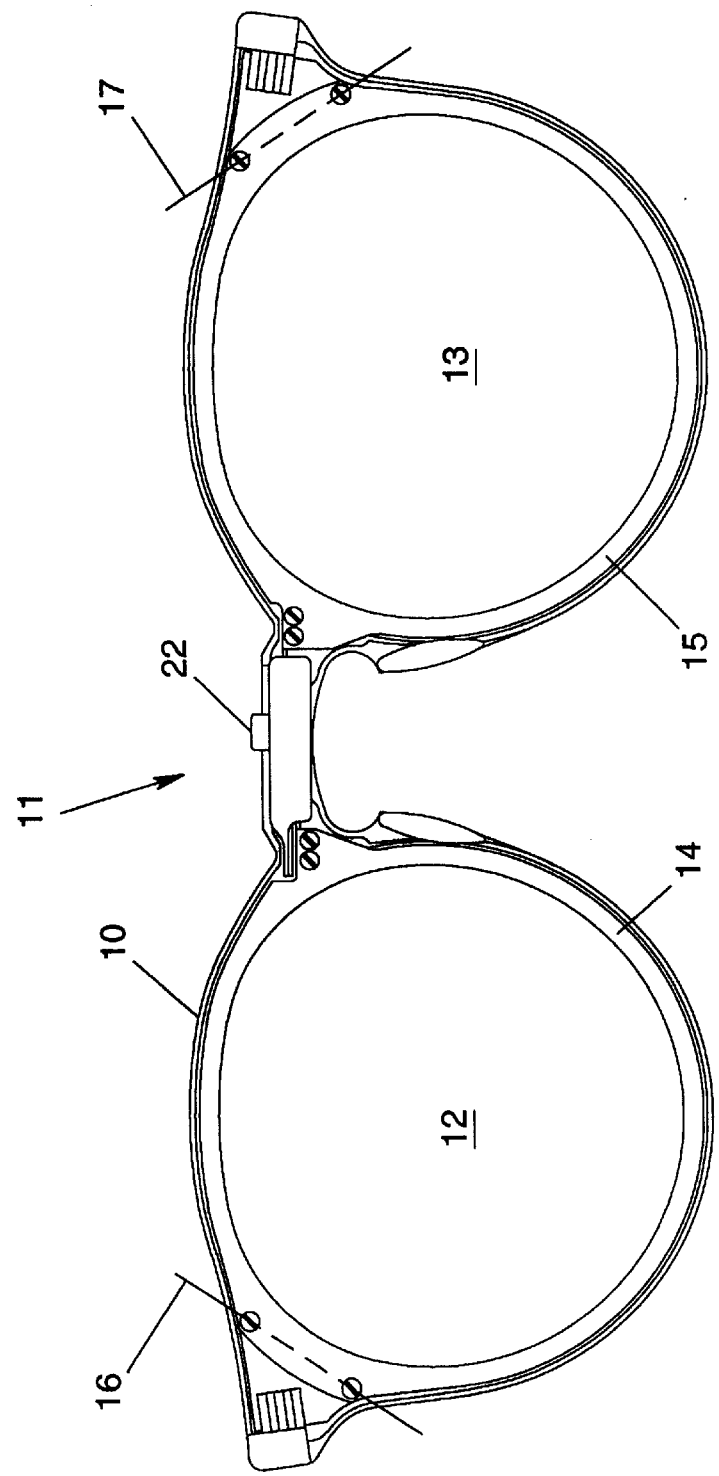
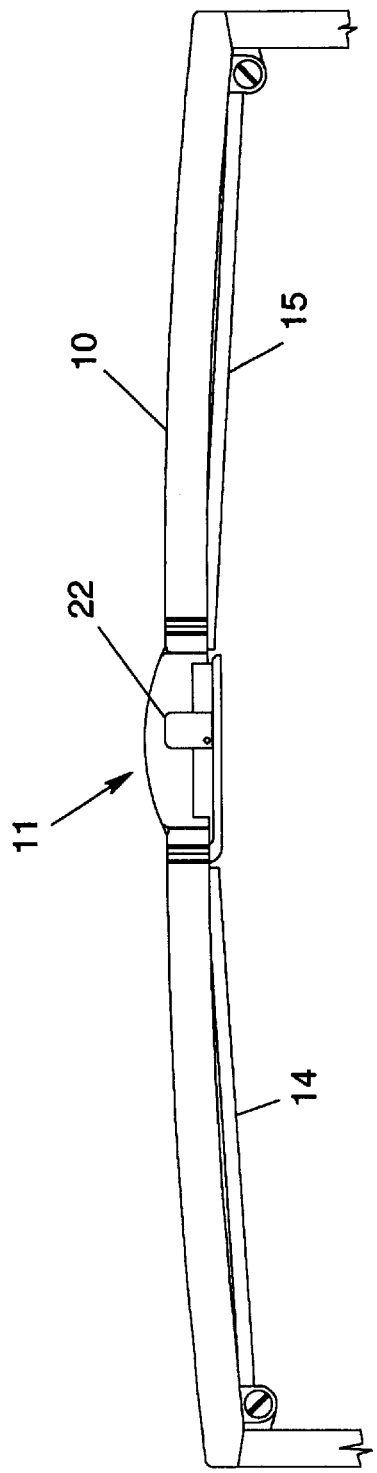

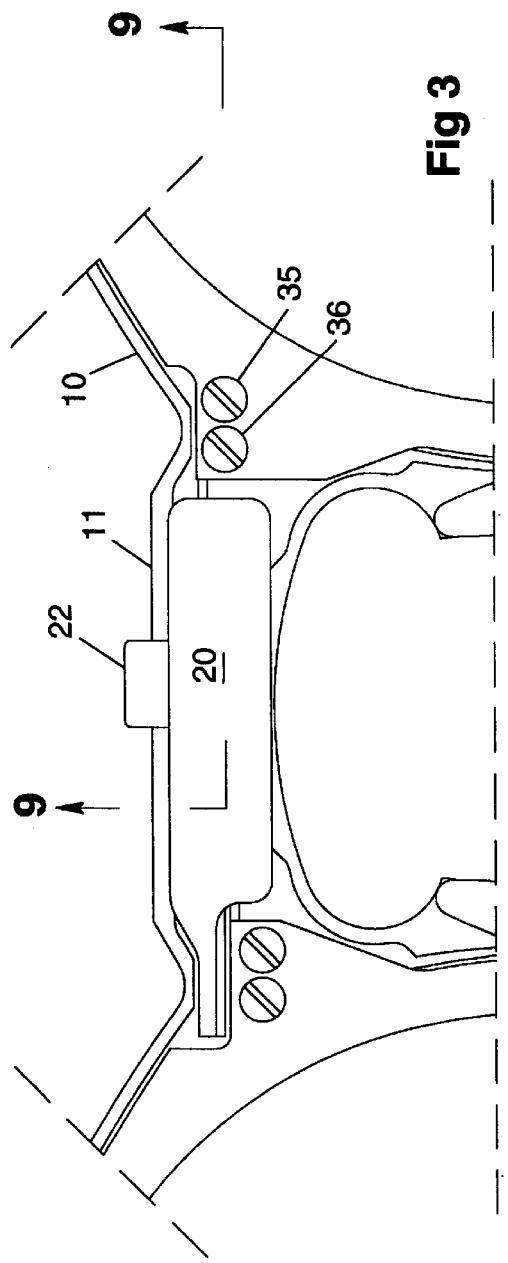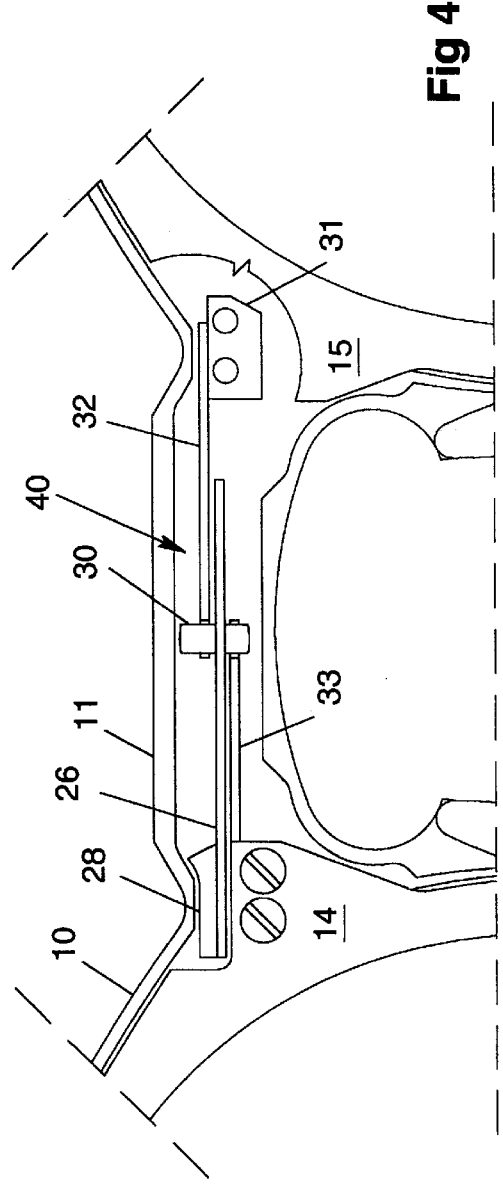

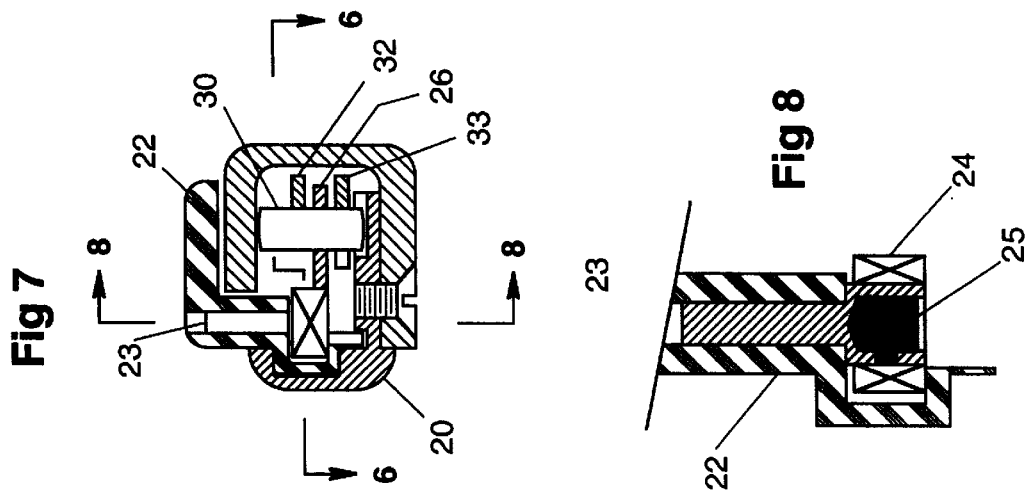
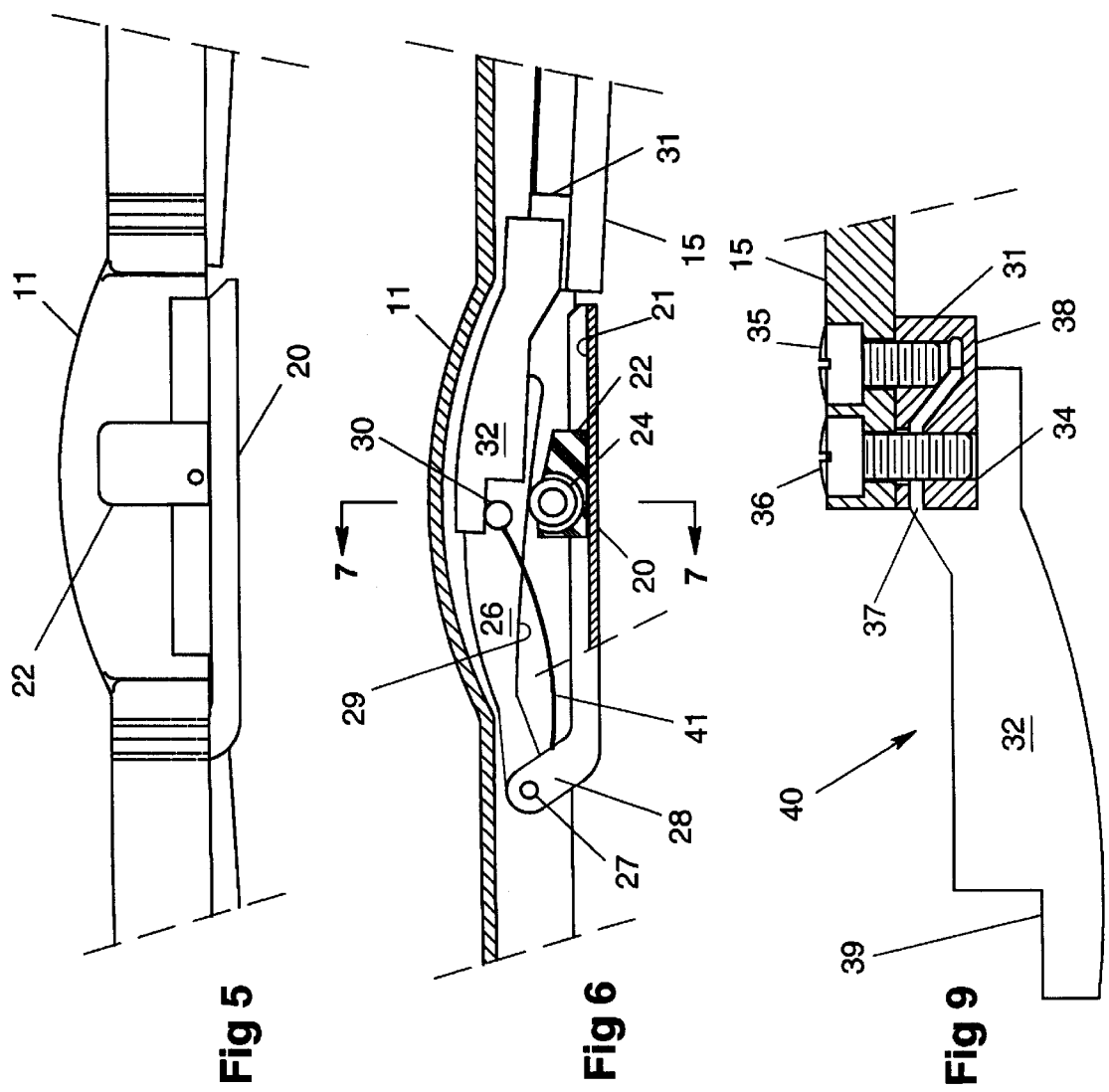

ACTUATION MECHANISM FOR VARIABLE FOCAL LENGTH SPECTACLES

BACKGROUND OF THE INVENTION

This invention relates to an actuating mechanism for simultaneously adjusting the optical powers of two variable focal length lens units which form part of a pair of spectacles. The invention is described in connection with lens units of the type disclosed in U.S. Pat. Nos. 5,138,494 (FIG. 9), 5,371,629, and 5,688,620. The disclosures of all of said patents are relevant hereto and are accordingly included herein by reference.

For purposes of convenience in explaining the present invention, a lens unit embodiment is shown herein which is comprised of 1) a front ring assembly which includes a distensible membrane stretched across the field of view of the lens unit, 2) a rear ring assembly which includes a rigid lens across the field of view of the lens unit, 3) a transparent liquid filling the space between the front and rear ring assemblies, 4) a sealing bellows which keeps the liquid from escaping, yet allows relative motion between the front and rear ring assemblies, and 5) hinging means between the front and rear ring assemblies. As the front and rear ring assemblies of a lens unit are moved closer and further apart (by rotation about the hinging means) the focal length of the lens unit is decreased or increased (i.e., its optical power is increased or decreased). More discussion of the construction and operation of such lens units may be had by reference to the aforementioned patents.

When two lens units are assembled into a pair of spectacles, it is necessary that an actuation means be provided to control the spacings of the ring assemblies simultaneously in such a way that changes in optical power of the lens units track closely. The present invention is intended to provide such a means. The normal tolerance for the optical power of lenses used in ophthalmic spectacles is ±⅛ diopter, hence it is desirable that the two variable focus lens units in a pair of spectacles track within that tolerance.

It is accordingly an object of the present invention to provide an actuation mechanism for variable focus spectacles that simultaneously adjusts the optical powers of the two embedded lens units in such a way as to minimize any tracking differences.

SUMMARY OF TH INVENTION

According to a presently preferred embodiment of the invention, each lens unit is fitted with a coupling member which couples it to an actuating cam located within the bridge of the spectacles. The coupling member preferably also includes means for making the adjustments necessary to initialize each lens unit to its appropriate set point. The actuator is driven by a slider which extends out of the top of the bridge so that it can be manipulated by the user's finger. Lens unit optical power is varied by moving the slider back and forth across the bridge. The slider drives the cam within the actuator, causing said cam to rotate as the slider is moved. The cam, in turn, engages both coupling members and causes them to move so as to simultaneously change the optical powers of each lens unit by the same incremental amount.

BRIEF DESCRIPTION OF THE DRAWINGS

FIG. 1 is a rear view (from the wearer's side) of a pair of spectacles including an actuation mechanism according to the present invention.

FIG. 2 is a top view of the spectacles of FIG. 1.

FIG. 3 is an enlarged fragmentary view of the bridge region of the spectacles of FIG. 1.

FIG. 4 is a view similar to that of FIG. 3, but with the housing and slider of the actuator removed (except for a small piece of the housing) to show how the coupling members are positioned. For clarity, a portion of the right rear ring is cut away.

FIG. 5 is an enlarged top view of the bridge region of the spectacles of FIG. 1.

FIG. 6 is an enlarged sectioned top view of the bridge region of the spectacles of FIG. 1, taken at 6—6 of FIG. 7. For clarity, the left lens unit and associated coupling member are not shown.

FIG. 7 is an enlarged cross section of the bridge region of the spectacles of FIG. 1, taken at 7—7 of FIG. 6. The scale of FIG. 7 is somewhat larger than that of FIG. 6.

FIG. 8 is a further enlarged sectioned fragment of the slider, taken from the same point of view as FIG. 7.

FIG. 9 is a sectioned view of the right coupling member, taken at 9—9 of FIG. 3.

DETAILED DESCRIPTION OF THE INVENTION

Figure 10:
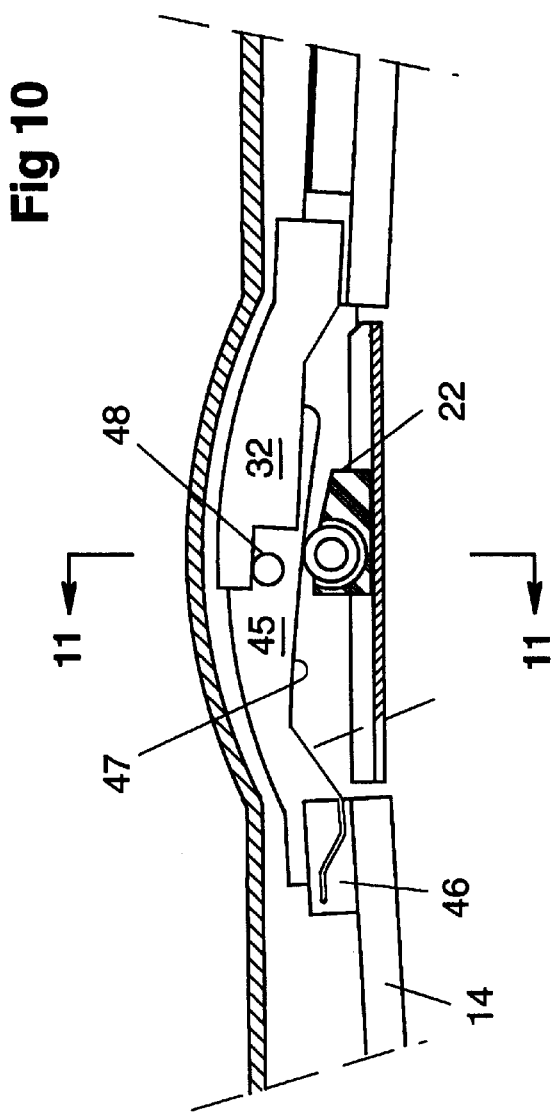
FIG. 10 is a cross sectional view of the bridge region of a pair of spectacles illustrating a second embodiment of the invention, the view being taken at 10—10 of FIG. 11.

FIGS. 1 and 2 show a pair of variable focus spectacles in which a presently preferred embodiment of the invented actuation mechanism is installed. The spectacles include a frame 10 having a bridge (generally indicated by the numeral 11). A pair of lens units (12 and 13) of the general type described in U.S. Pat. Nos. 5,138,494, 5,371,629, and 5,668,620 are shown, one on either side of the bridge. The rear rings 14 and 15 of the lens units are visible in FIGS. 1 and 2. The front rings, which are not visible, are fastened securely to the frame 10, and do not move relative to said frame. The hinging means which connect the front and rear rings are also not visible, but the axes of rotation between the rings are indicated as 16 and 17. As the rear rings are rotated toward the front rings about the axes 16 and 17, the optical powers of the lens units increase.

FIGS. 3 through 6 are somewhat enlarged views of the nasal portion of the spectacles of FIG. 1. Note that, for clarity, only the right lens unit (13) and it associated coupling member is shown in FIG. 6.

Actuator housing 20, which is fastened to frame 10 by screws, includes a longitudinal recess 21 on its inner surface, in which finger-operated slider 22 slides, the slider 22 being shown in the FIGS. at about the middle of its travel. Spindle 23, which carries free-to-turn roller 24, is pressed into slider 22. The roller 24 preferably has a serrated periphery to inhibit its sliding along the cam surface 29 and thereby creating excessive wear. The end of spindle 23 adjacent to roller 24 preferably includes a grease reservoir 25 to provide lubrication for the roller/spindle interface. The grease reservoir, as shown, consists of an axial hole in which to store grease, and a small radial hole (size exaggerated in the drawing) to feed the grease (as the roller turns) from the storage volume to the interface between the spindle and the roller.

As the slider 22 is moved back and forth, roller 24 engages cam 26 causing said cam to rotate about pin 27. Pin 27 extends out of arm 28 (a part of housing 20). Drive pin 30, pressed into cam 26, engages the coupling members as will be discussed below. The shape of cam surface 29 and its position relative to pin 27 governs the relationship between slider motion and incremental lens unit optical power. A slightly concave shape has been found to provide the best adjustment sensitivity near the reading position, and is therefore presently preferred. A length of music wire 41, acting as a spring, extending between a hole in arm 28 and a hole in drive pin 30 may be used to urge the cam 26 against roller 24. This spring aids in the assembly process by keeping the slider in recess 21 while the housing is being installed onto a frame, and also keeps the cam against the roller at the left end of the roller travel, even if the lens unit restoring forces are low.

Each of the lens units carries a coupling member extending inward from the rear ring toward the bridge. FIG. 9 shows a sectional view of the right coupling member (indicated generally by the numeral 40). The left coupling member is similar, but because of space limitations, its shape may be slightly different. The coupling blade 33 of the left coupling member can be seen in FIG. 4. As seen in FIG. 9, the right coupling member 40 is comprised of a block 31 to which a coupling blade 32 is welded. The weld is preferably a laser weld along one edge, as shown by the heavy line numbered 34 on FIG. 9. The weld may be continuous, as indicated in the drawing, or it may consist of several disjointed spots.

Two screws, 35 and 36, are involved in attaching the coupling member to rear ring 15. Screw 35 is a fixing screw, and securely attaches the block to the ring. Screw 36 is an adjusting screw which is used to set the optical power of the associated lens unit upon initialization. Instead of using a screw 35 to fasten the coupling member to the lens unit, the block could alternatively be attached by welding or adhesive means.

The block 31 includes a slot 37 which extends from the front end of the block toward the rear end, taking a path which creates a weakened section of the block , i.e., relatively thin web 38, near one side of the block adjacent the rear end. As can be seen in FIG. 9, weld 34 stops short of the web so as not to interfere with bending. The hole in the portion of block 31 adjacent to rear ring 15 at screw 36 is a clearance hole for the screw, whereas the hole on the other side of slot 37 is tapped. Tightening screw 36 causes the slot 37 to narrow at screw 36, the block bending at web 38. The position of blade surface 39, which engages drive pin 30, therefore is adjustable by tightening screw 36, permitting the initial optical power of the associated lens unit to be set.

In order to allow for manufacturing tolerances, when the slider is in its extreme left position (i.e., the distance position) and before screw 36 is tightened, the surface 39 of coupling member 40 is preferably spaced slightly from drive pin 30. The corresponding surface of the left coupling member is similarly spaced from the drive pin.

The initial adjustment preferably involves setting the optical power of each lens unit to the distance power required by the intended user, with the slider set at the distance position. This is accomplished by tightening the adjusting screw (36) of each coupling member until the respective lens unit has the desired optical power. The initial setting could also be done when the slider is at the max read position, or at some other convenient position, if desired. The order of steps in making the initial adjustments is a matter of convenience, the order disclosed herein being only one possible example.

Note that the rear surface of the rigid lens (carried by the rear ring) is preferably ground to have slightly less spherical optical power than the intended user requires for distance viewing (perhaps 3/4 diopter less). The actual amount of cylindrical power (if any) required by the user is also ground on this surface.

Only spherical power changes are involved in the variable focus aspects of the invented lens units because, for virtually all users, the "reading add" required does not include cylindrical components. Because the rear surface of the rigid lens is ground with less than the required distance optical power, as noted above, a small amount of additional power is required to achieve the proper optical power for distance viewing. This additional optical power is added as screw 36 is tightened during the initial step.

There are two reasons for requiring the 3/4 of initial offset. One is that the distension of the membrane at the distance setting provides some restoring force to assure that the lens unit will return to its distance setting each time that the slider is moved to the left extreme. The other reason is that a convex membrane is believed to be more cosmetically pleasing than a flat one.

After the initial settings of the lens units have been accomplished, the slider can be moved to any place within its travel, and the optical powers of the lenses will track. If the slider is moved to the right, roller 24 causes the cam to rotate counter clockwise (as viewed from the top), and drive pin 30 moves both blades 32 and 33 simultaneously to cause the respective rear rings to rotate toward the front rings so as to increase the optical powers of both lens units.

In practical spectacles, the parts of the actuation mechanism are necessarily tiny, but the forces involved in adjusting the optical powers of the lens units may be relatively substantial. Consequently, significant bending of the parts will most likely be encountered. In order to achieve an adequate level of tracking of optical powers as between the two lens units, the actuation mechanism should be balanced in the sense that the amount of motion lost to bending on each lens unit should be very close to the same. As noted above, space limitations may require that the blades 32 and 33 be of somewhat different shapes. Because bending of the coupling members in practical spectacles may not be trivial, it may prove necessary to proportion the blades to achieve a similar amount of bending in each, thereby achieving adequate symmetry.

Figure 11:
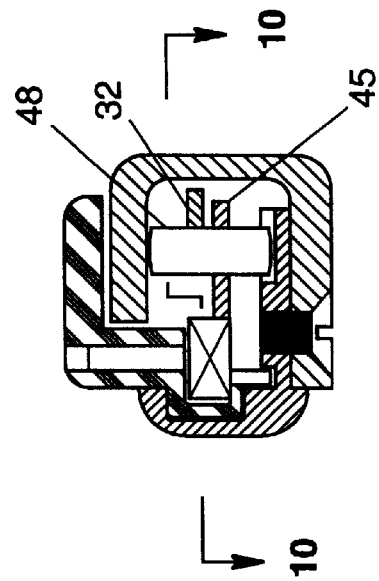
FIG. 11 is a sectioned top view of the bridge region of the second embodiment of the invention, taken at 11—11 of FIG. 10.

FIGS. 10 and 11 depict a second embodiment of the invention. In this embodiment, instead of having a separate cam lever (26) that pivots around a point on the housing and drives both coupling members, a cam surface 47 is machined onto the left coupling member blade 45 so that the slider 22 drives the left coupling member blade directly. The right coupling member blade 32 is driven from the left coupling member blade through drive pin 48. Left coupling member blade 45 is welded to block 46, which in turn is attached to the left rear ring 14 in the manner discussed above in connection with the the coupling members of the first embodiment. Since this second embodiment is somewhat less symmetric than the first embodiment described, it may be found that some of the components will have to be designed to have greater stiffness in order that the lens units track satisfactorily.

We claim:

1. An actuation mechanism for spectacles which include two variable focus lens units comprising:

a frame having a bridge, said lens units being mounted to said frame, one on either side of said bridge;

a rotatable cam;

a linearly-movable finger-operated slider engaging said cam, said cam rotating as said slider is moved; and a pair of coupling members, one being attached to each of said lens units, both of said coupling members being engaged by said cam for motion as said cam rotates.

2. An actuation mechanism for spectacles as recited in claim 1 wherein said cam is positioned between said coupling members, and further including a drive pin attached to said cam for engaging said coupling members.

3. An actuation mechanism for spectacles as recited in claim 1 and further including a housing located within said bridge, said cam being rotatably attached to said housing and said slider running in a recess formed in said housing.

4. An actuation mechanism for spectacles as recited in claim 1 and further including a roller and a spindle, wherein said spindle is carried by said slider and said roller contacts said cam and rotates around said spindle as said slider is moved.

5. An actuation mechanism for spectacles as recited in claim 4 wherein said spindle includes an axial bore for storing grease and a radial hole intersecting said axial bore.

6. An actuation mechanism for spectacles as recited in claim 1 wherein said slider includes a finger pad located above said bridge.

7. An actuation mechanism for spectacles which include two variable focus lens units which comprises:

a frame including a bridge, said lens units being mounted to said frame, one on either side of said bridge;

a pair of coupling members, one mounted to each of said lens units;

means for coupling together said coupling members within said bridge;

a cam coupled to said coupling members; and a finger-operated slider mounted for linear motion within said bridge and engaging said cam.

8. An actuation mechanism for spectacles as recited in claim 7 wherein said cam is formed on one surface of one of said coupling members.

9. An actuation mechanism for spectacles as recited in claim 7 wherein said means for coupling together said coupling members is comprised of a drive pin attached to one of said coupling members.

10. An actuation mechanism for spectacles as recited in claim 7 wherein said cam is rotatable and is positioned between said coupling members, and further including a drive pin attached to said cam for driving both of said coupling members.

11. An actuation mechanism for spectacles as recited in claim 7 and further including a housing located within said bridge, said cam being rotatably attached to said housing and said slider running in a recess formed in said housing.

12. An actuation mechanism for spectacles as recited in claim 7 and further including a roller and a spindle, wherein said spindle is carried by said slider and said roller contacts said cam and rotates around said spindle as said slider is moved.

13. An actuation mechanism for spectacles as recited in claim 12 wherein said spindle includes an axial bore for storing grease and a radial hole intersecting said axial bore.

14. An actuation mechanism for spectacles as recited in claim 7 wherein said slider includes a finger pad located above said bridge.

* * * * *